(12) United States Patent
Peng et al.

(10) Patent No.: US 10,705,981 B2
(45) Date of Patent: Jul. 7, 2020

(54) METHOD AND APPARATUS FOR DATA STORAGE SERVICE

(71) Applicant: EMC IP Holding Company LLC, Hopkinton, MA (US)

(72) Inventors: Layne Lin Peng, Shanghai (CN);
Accela Yilong Zhao, Shanghai (CN);
Junping Frank Zhao, Beijing (CN);
Yu Cao, Beijing (CN); Xiaoyan Guo, Beijing (CN); Zhe Dong, Beijing (CN);
Sanping Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/457,835

(22) Filed: Mar. 13, 2017

(65) Prior Publication Data

US 2017/0262385 A1 Sep. 14, 2017

(30) Foreign Application Priority Data

Mar. 14, 2016 (CN) .......................... 2016 1 0144505

(51) Int. Cl.
| | |
|---|---|
| *G06F 3/06* | (2006.01) |
| *G06F 12/14* | (2006.01) |
| *H04L 29/08* | (2006.01) |
| *G06F 21/78* | (2013.01) |

(52) U.S. Cl.
CPC ........ *G06F 12/1433* (2013.01); *G06F 3/0605* (2013.01); *G06F 3/067* (2013.01); *G06F 3/0629* (2013.01); *G06F 3/0646* (2013.01); *G06F 21/78* (2013.01); *H04L 67/1097* (2013.01); *G06F 12/1408* (2013.01); *G06F 2212/1052* (2013.01); *G06F 2221/032* (2013.01)

(58) Field of Classification Search
CPC .... G06F 3/0605; G06F 3/0629; G06F 3/0646; G06F 3/067
See application file for complete search history.

(56) References Cited

U.S. PATENT DOCUMENTS

| | | | |
|---|---|---|---|
| 7,552,056 B2 | 6/2009 | Todd et al. | |
| 9,015,712 B1 | 4/2015 | Hodge et al. | |
| 9,479,585 B1 * | 10/2016 | Jobanputra | ......... H04L 67/1097 |
| 9,569,139 B1 | 2/2017 | Mendes et al. | |
| 9,984,079 B1 * | 5/2018 | Stickle | .................. G06F 3/0685 |

(Continued)

FOREIGN PATENT DOCUMENTS

CN 103714133 4/2014

*Primary Examiner* — Ryan Bertram
*Assistant Examiner* — Edmund H Kwong
(74) *Attorney, Agent, or Firm* — BainwoodHuang

(57) ABSTRACT

Embodiments of the present disclosure provide a method and apparatus for providing data storage service. The method comprises: receiving a storage service template from an user, the storage service template specifying a storage service policy for the user and a service instance to launch; and providing a storage service according to the storage service template; wherein the storage service policy defines a storage function to be performed for data of the user. With the method and apparatus according to embodiments of the present disclosure, a unified solution for overall orchestration of storage functions can be provided to enable the user to customize the required storage function flexibly.

22 Claims, 5 Drawing Sheets

(56) References Cited

U.S. PATENT DOCUMENTS

| | | | |
|---|---|---|---|
| 2006/0294219 A1* | 12/2006 | Ogawa | H04L 41/0893 |
| | | | 709/224 |
| 2007/0083575 A1* | 4/2007 | Leung | G06F 17/30082 |
| 2010/0145917 A1* | 6/2010 | Bone | G06F 17/30221 |
| | | | 707/694 |
| 2010/0332454 A1* | 12/2010 | Prahlad | G06F 17/30082 |
| | | | 707/654 |
| 2016/0078245 A1* | 3/2016 | Amarendran | G06F 16/164 |
| | | | 713/193 |

* cited by examiner

METHOD AND APPARATUS FOR DATA STORAGE SERVICE

RELATED APPLICATIONS

This application claims priority from Chinese Patent Application Number CNC201610144505.4, filed on Mar. 14, 2016 at the State Intellectual Property Office, China, titled "METHOD AND APPARATUS FOR DATA STORAGE SERVICE" the contents of which is herein incorporated by reference in its entirety.

FIELD

Embodiments of the present disclosure relate to storage systems, and more specifically relate to methods and apparatuses for providing data storage functions/services.

BACKGROUND

In the field of data storage, more and more storages are software defined and storage functions/services are gradually virtualized. For instance, some hardware apparatuses are migrated to a pure software solution and installed, for example, on x86 machines.

EMC™ is one of the top storage solution providers and possesses various storage technologies, such as storage built-in data replication, RPA and TwinStrata, Maginatics/CloudBoost, Spinning, etc. Besides, EMC™ has also made many trials for solutions of software defined storages.

However, there is no flexible and unified solution available at present that enables a user to customize provided storage services and enables the customization to be partially reusable for another user.

Embodiments of the present, disclosure provide a method and apparatus to solve at least some of the above problems.

SUMMARY

Embodiments of the present disclosure provide methods and apparatuses for providing a storage service in a storage system. A brief summary of the embodiments is provided below to provide a basic understanding of some aspects of the embodiments. The summary does not intend to indicate key points of the essential elements or to describe scope of the embodiments. Its sole purpose lies in presenting some concepts in a simplified form as a preamble for more detailed description in the following context.

A first aspect of the present disclosure provides a method for a storage service. The method comprises: receiving, from an user, a storage service template specifying a storage service policy for the user and a service instance to launch; and providing the storage service according to the storage service template; wherein the storage service policy defines a storage function to be performed for data of the user.

In an embodiment, the storage service template may specify the storage service policy for the user by indicating at least one storage service policy from a predefined set of storage service policies.

In another embodiment, a storage service policy can be defined with work flow engine, wherein a task in the work flow engine corresponds to a storage function node or a type of storage service.

In still another embodiment, the storage service template may further specify a network for providing the storage service.

In an embodiment, the storage service policy may further define an execution module for the storage function, and/or a parameter for performing the storage function. In another embodiment, the execution module for the storage function comprises a virtual machine or a container image.

In a further embodiment, a parameter for performing the storage function may include an execution order and/or a triggering condition for the storage function.

A second aspect of the present disclosure provides an apparatus for data storage services, the apparatus comprises: a receiving unit configured to receive, from an user, a storage service template specifying a storage service policy for the user and a service instance to launch; and an executing unit configured to provide a storage service according to the storage service template; wherein the storage service policy defines a storage function to be performed for data of the user.

A third aspect of the present disclosure provides an apparatus comprising at least one processor and at least one memory comprising computer program code, wherein the at least one memory and the computer program code are configured, with the at least one processor, to cause the apparatus to implement a method according to the first aspect of the present disclosure.

A fourth aspect of the present disclosure provides a computer program comprising instructions which, when executed in at least one processor, cause the at least one processor to implement a method according to the first aspect of the present disclosure.

With methods or apparatuses according to embodiments of the present disclosure, the user can customize a required storage function flexibly and avoid complicated manual operations. Moreover, embodiments of the present disclosure provide a unified solution for overall orchestration of storage functions.

Though specific embodiments are provided by way of example in the drawings, it should be understood that description of the detailed embodiments does not intend to limit the embodiments as to the disclosed specific form disclosed.

BRIEF DESCRIPTION OF THE DRAWINGS

Objectives, advantages and other features of the present disclosure will become more apparent in the following disclosure and claims. Just for illustration purpose, example embodiments are described here in a non-limitative manner with reference to the drawings, in which:

DETAILED DESCRIPTION OF EMBODIMENTS

In the following description, many details are illustrated for the purpose of illustration. However, those skilled in the art would realize that embodiments of the present disclosure may be implemented without the specific details. Therefore, the present disclosure is not intended to be limited by the embodiments shown here but will be invested with the broadest scope consistent with the principles and features described herein.

It is to be understood that terms "a first" "a second", etc. are only used to distinguish one element from another. As a matter of fact, a first element can also be called a second element and vice versa. It should further be understood that "comprising" and "including" are only used to indicate the presence of the illustrated features, elements, functions or components without excluding the presence of one or more other features, elements, functions or components.

As stated above, software defined storage is a trend of development currently. Many trials have been made in this aspect. For instance, EMC™ has made the following researches:

virtualize the current storage technology: based on technologies like virtual applications (vApps), the storage function can be put into a virtual machine which can run on an x86 machine.
   containerize the existing storage technology: encapsulate the storage function into a container for fast deployment, launching and expanding. For example, EMC™ has published a virtual machine with replication function vVNX and vRPA, and they can be encapsulated as a container or Intel ClearLinux VM or VMWare Photon. Intel ClearLinux VM is a customized Linux with a starting time of about 200 ms and 20 MB storage footprint.

However, similar to most of the micro-service architecture, it should be noted that a problem to be addressed for the current virtualized storage solution is how to determine the granularity of the encapsulated storage function. Too big granularity would render the function difficult to be reused while too small granularity would require a powerful and complicated orchestration solution for the storage functions/services.

To solve at least some of the above problems, inventor of the present application proposes that the storage function/service should be orchestrated from global view of point and there are provided a method and apparatus in the embodiments of the present disclosure for chaining the storage function/service according to a predefined rule to meet various storage service requirements.

Figure 1:
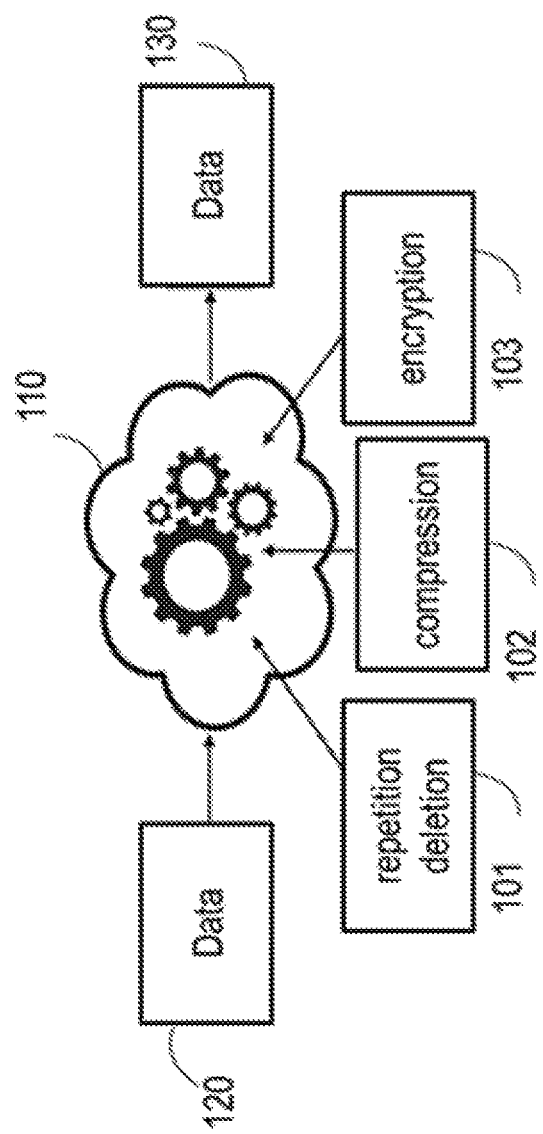
FIG. 1 illustrates a schematic diagram of chaining storage function/service according to an embodiment of the present disclosure.

FIG. 1 illustrates a schematic diagram of chaining storage function/service according to an embodiment of the present disclosure. In FIG. 1, only three storage functions of repetition deletion 101, compression 102 and encryption 103, are presented as examples. However, those skilled in the art should understand that the method and apparatus according to embodiments of the present disclosure can be used to chain more or less or other storage functions. As illustrated in FIG. 1, according to an embodiment of the present disclosure, a plurality of storage functions can be chained according to a particular sequence and condition as required to form a chained storage function 110. User data 120 is processed by the chained storage function 110 to obtain processed data 130 desired by the user.

Figure 2:
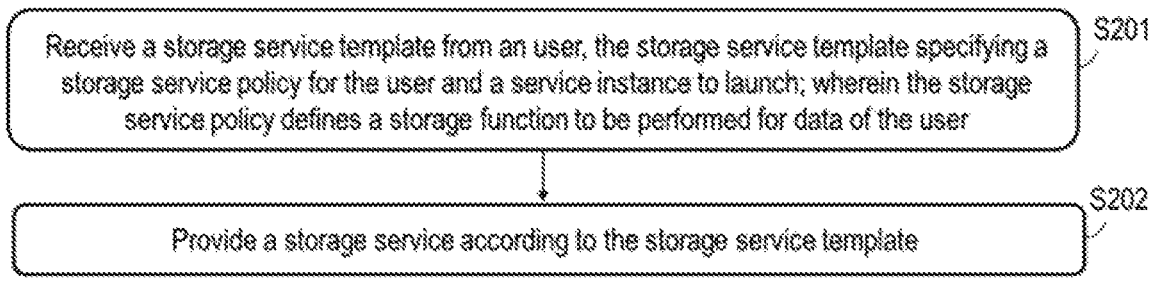
FIG. 2 illustrates a flow map of an example method for data storage service according to an embodiment of the present disclosure.

The flow chart of the example method 200 for data storage service according to an embodiment of the present disclosure is illustrated in the following with reference to FIG. 2. Method 200 can be implemented, for instance, with a controller for data storage service. As shown in FIG. 2, method 200 comprises: at block S201, receiving a storage service template from the user. The storage service template specifies the storage service policy for the user and the service instance to run. At block S202, the storage service is provided according to the storage service template. According to embodiments of the present disclosure, the storage service policy defines the storage function to be applied to the user data.

In an embodiment, the storage service template can further comprise a name and/or identifier (ID) of the template.

In an embodiment, at block S201, the storage service template can be received from the user in the form of a file, instruction or message. Embodiments of the present disclosure are not limited to any specific form of the storage service template.

In another embodiment, the storage service template specifies the storage service policy for the user by indicating at least one storage service policy from the predefined set of storage service policies.

Optionally, in still another embodiment, the storage service policy may also define an execution module of the storage function, and/or a parameter for executing the storage function. In an embodiment, the execution module of the storage function can include, but is not limited to, a virtual machine or container images. In another embodiment, the execution module of the storage function may also be specified in the storage service template rather than in each storage service policy.

In an example, each storage service policy of the set of storage service policies may specify chaining and execution conditions (or triggers) for a particular storage function. Thus, by specifying a proper index or reference identifier of a storage service policy in the storage service template, a corresponding storage service policy can be executed and the storage function desired by the user can be realized.

Additionally, embodiments of the present disclosure are not limited to any particular format/form to define storage service policy. Just as an example, the storage service policy may be defined with a work flow engine. The work flow engine may have the following concepts: namely, systematically organizing resource into a process which changes substance, provides service or processes information. According to embodiments of the present disclosure, each task in the work flow engine may correspond to a storage function node or a storage service. In an embodiment, the input data in the work flow may correspond to information and/or substance and/or energy required to complete the storage processing procedure. In another embodiment, the task in the work flow may correspond to a rule and algorithm for storage processing. The rule will cause resource consumption and the resource is provided by the hosted virtual machine or container. In another embodiment, the output data of the work flow may correspond to the information and/or substance and/or energy produced by the processing steps and are provided as input of a downstream step. Two storage functions/services can be chained/plugged together only if the output of one previous storage function/service is equal to the mandatory input requirements of the following component. As can be understood by those skilled in the art, defining the storage service policy with a work flow engine is not the sole option.

In an embodiment, the storage service template can specify a network for providing the storage service. For example, the storage service template can specify one or more of the identifier, IP address and type of the network where each virtual machine or container image locates. The type of the network is particularly important in storage function/service connection. The majority of the storage services are data plane services that data will through. Data can be encrypted by different tunnels depending on different network types.

In another embodiment, parameters defined by the storage service policy for implementing storage function can include, but are not limited to, the execution order and/or triggering conditions of the storage function.

For the method according to embodiments of the present disclosure, a function/service (including file and block, such as replication, recovery, snapshot, or compression/decompression, encryption/decryption, etc.) can be regarded as a function node and each node may be provided by a service virtual machine or a container to operate one or more services dynamically. The method according to an embodiment of the present disclosure enables multiple nodes to be chained in a proper order for performing a complete work.

As stated above, the storage service template is a main component forming the chained storage system. With the storage service template, the user defines how data processing works. For the purpose of illustration rather than limitation, examples for storage service template and storage service policy are provided. Those skilled in the art can understand that in some embodiments, an implementation different from the example provided can be employed. As an example, storage service template may take different forms, such as XML, JSON, YAML, INI, etc. YAML is taken as an example in the following description.

In an embodiment, the following four storage service policies are predefined:
  stream read: this policy reads data from a given sock. As an output-only policy, it cannot follow another policy;
  encryption: this policy will start a virtual machine for data encryption. It can accept a data input and output it to another policy after encryption;
  if_condition: this policy accepts a set of parameters to verify a data input and re-directs the data to different policies based on a determining condition;
  backup: this policy will receive data and keep it. As an input-only strategy, it cannot be followed by another policy.

Figure 3:
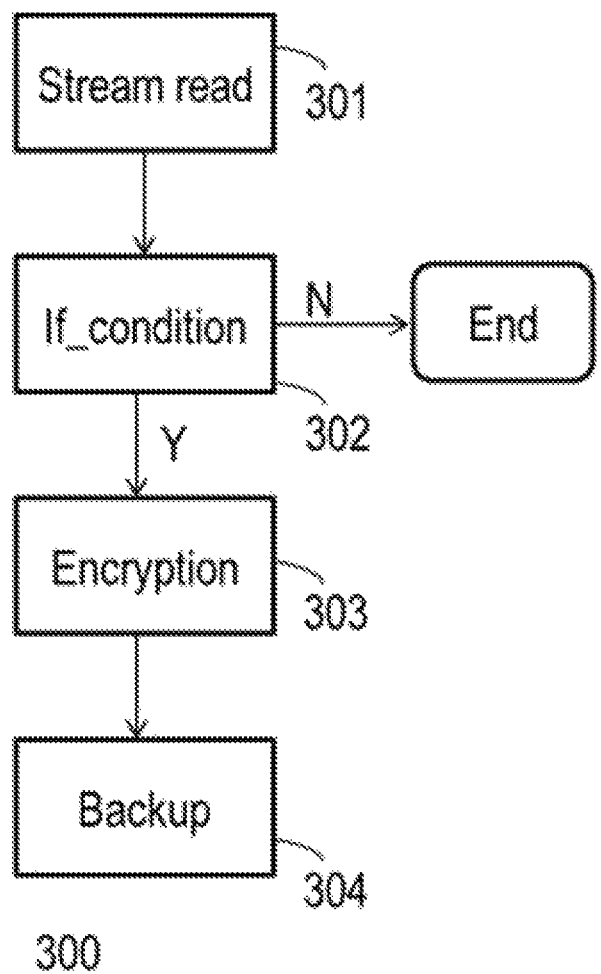
FIG. 3 illustrates the process flow defined by an example storage service template.

As shown in FIG. 3, in this embodiment, the storage service template can define the following processing flow 300:
  running the stream read policy at block 301 to start two virtual machines (VM) so as to read tax data from a given socket;
  running the if_condition policy at block 302 to check whether annual income of a taxpayer exceeds 120,000 yuan;
  if yes, running the encryption policy at block 303 to encrypt the data; and
  at block 304, by running the backup policy, retaining the encrypted data in a backup storage device.

For example rather than limitation, to realize this purpose, a storage service template can be illustrated as follows:
(Service Template)
id: 1b0bab91-7abd-4247-9742-83e2829dafa0 (id of the storage service template)
name: Declare Tax Data (name of the storage service template)
policies:
  id: 001 (id of the storage service policy)
    policy_ref: eb79cc29-94e5-411e-8ecf-2749c6b7e52b (reference number of the storage service policy)
    instance: 2 (instance)
    parameter: {sock: xxx.sock} (parameter)
    network: (network)
      network_id: 0ee2f287-c095-4b87-a271-9a762720dfac (id of the network)
      ip: 10.10.132.30 (network address)
      type: vxlan (type of the network)
  id: 002
    policy_ref: 8e9cf3bf-a210-4149-a690-4985e085f75d
    instance: 1
    parameters: {format: csv, check_field: income, true_expr:>120,000, true_to: 003}
    network:
      network_id: 0ee2f287-c095-4b87-a271-9a762720dfac
      ip: 10.10.132.32
      type; vxlan
  id: 003
    policy_ref: 2f552a40-cf58-4a4a-beed-56b0533c218c
    instance: 2
    parameter: {to: 004}
    network:
      network_id: 0ee2f287-c095-4b87-a271-9a762720dfac
      ip: 10.10.132.32
      type: vxlan
  id: 004
    policy_ref 9ed1fb02-144d-473d-bfdf-9e52d9cb08d7
    instance: 1
    network:
      network_id: 0ee2f287-c095-4b87-a271-9a762720dfac
      ip: 10.10.132.33
      type: vxlan
(Service Policy: StreamReader) (storage service policy: stream read)
id: eb79cc29-94e5-411e-8ecf-2749c6b7e52b (id)
name: StreamReader (name)
mode: output (mode)
image: xxx/StreamReader.qcow (image)
(Service Policy: Encryption) (storage service policy: encryption)
id: 2f552a40-cf58-4a4a-beed-56b0533c218c
name: encryption
mode: input&output
image: xxx/encription.qcow
(Service Policy: If_Condition) (storage service policy: if_condition)
id: 8e9cf3bf-a210-4149-a690-4985e085f75d
name: If_condition
mode: input&output
image: xxx/if.qcow
(Service Policy: Backup) (storage service policy: backup)
id: 9ed1fb02-114d-473d-bfdf-9e52d9cb08d7
name: backup
mode: input
image: xxx/backup.qcow Now a schematic structure of apparatus 400 according to an embodiment of the present disclosure is illustrated with reference to FIG. 4. Apparatus 400 may be a controller for data storage service or a part thereof. Apparatus 400 can implement method 200 described with reference to in FIG. 2 but is not limited to performing the method 200. Likewise, the method 200 can be implemented by apparatus 400 but is not limited to being implemented by the apparatus 400. For example, at least some operations of method 200 may be implemented by other apparatuses.

Figure 4:
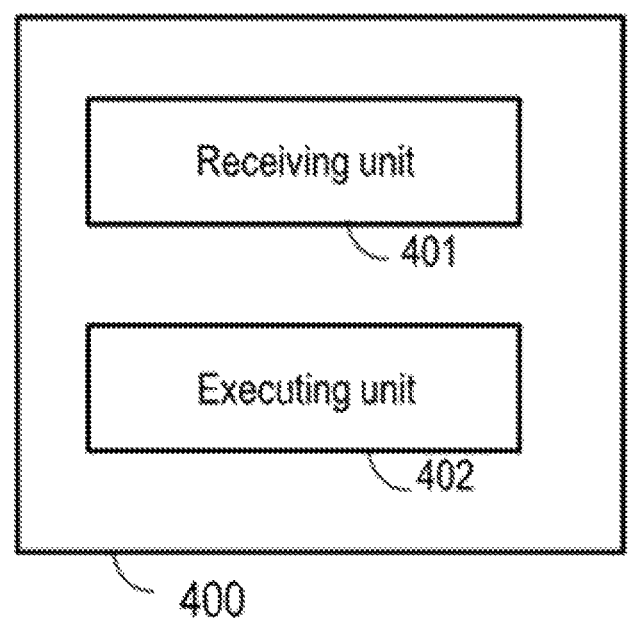
FIG. 4 illustrates a schematic structure diagram of the example apparatus for data storage service according to an embodiment of the present disclosure.

As shown in FIG. 4, the apparatus 400 comprises a receiving unit 401 configured to receive a storage service template from a user. The storage service template specifies a storage service policy for the user and a service instance to be run; an executing unit 402 configured to provide the storage service according to the storage service template, wherein the storage service policy defines a storage function to be performed for the user data.

In an embodiment, the storage service template may further comprise name and/or ID of the storage service template.

In another embodiment, the storage service template may specify the storage service policy for the user by indicating at least one storage service policy from a predefined set of storage service policies.

In another embodiment, the storage service policy may be defined with a work flow engine, wherein each task in the work flow engine corresponds to a storage function node or a kind of storage service. In an embodiment, input data in the work flow may correspond to information and/or substance and/or energy required to complete a storage processing step. In another embodiment, a task in the work flow may correspond to a rule and algorithm for the storage processing. The rule will cause resource consumption while the resource is provided by a hosted virtual machine or container. In another embodiment, output data of the work flow may correspond to information and/or substance and/or energy produced by the processing procedure and they are provided as input of a downstream step. Only if output of one previous storage function/service equal to a mandatory input requirement of a following component, the two storage functions/services can be chained/plugged together. As can be understood by those skilled in the art, defining a storage service policy with the work flow engine is not the sole option.

In an embodiment, the storage service template may also specify a network for providing the storage service. For example, the storage service template may specify at least one of the type, IP address and identifier of the network where each virtual machine or container image is located.

Optionally, in still another embodiment storage service policy may further define an execution module of the storage function, and/or parameters for executing the storage function. In an embodiment, the execution module of the storage function may include but is not limited to the virtual machine or container image. In another embodiment, the execution module of the storage function may also be specified in the storage service template rather than in a storage service policy.

In still another embodiment, parameters defined by the storage service policy for executing the storage function may include, but are not limited to an execution order and/or triggering condition of the storage function.

As can be understood by those skilled in the art, apparatus 400 may further comprise other units not shown in FIG. 4; and/or, in some embodiments, some units in FIG. 4 can be omitted.

Before the method and apparatus according to embodiments of the present disclosure are proposed, there is no efficient way for orchestrating storage functions/services. With the method and apparatus according to embodiments of the present disclosure, multiple storage functions can be chained flexibly to achieve a desired processing.

Those skilled in the art would readily realize that the blocks or steps of the above methods may be implemented with a programmed computer. In the present disclosure, some embodiments also intend to cover a computer program comprising instructions which, when implemented in at least one processor, cause the at least one processor to implement method 200. In the present disclosure, some embodiments also intend to cover a program storage system, for instance, a digital data storage medium which stores an instruction program readable by a machine or a computer and executable by an encoded machine or a computer, wherein the instructions implement some or all of the steps of the above method 200. The program storage system may be, for instance, a digital storage, a magnetic storage medium like magnetic disk and tape, hard disk driver or optical readable digital data storage medium. The embodiment also intends to cover a computer programmed to implement steps of the above method. Some embodiments intend to cover an apparatus comprising at least one processor, and at least one memory comprising computer program code, wherein the at least one memory and the computer program code are configured to, with the at least one processor, cause the apparatus to implement method 200.

Figure 5:
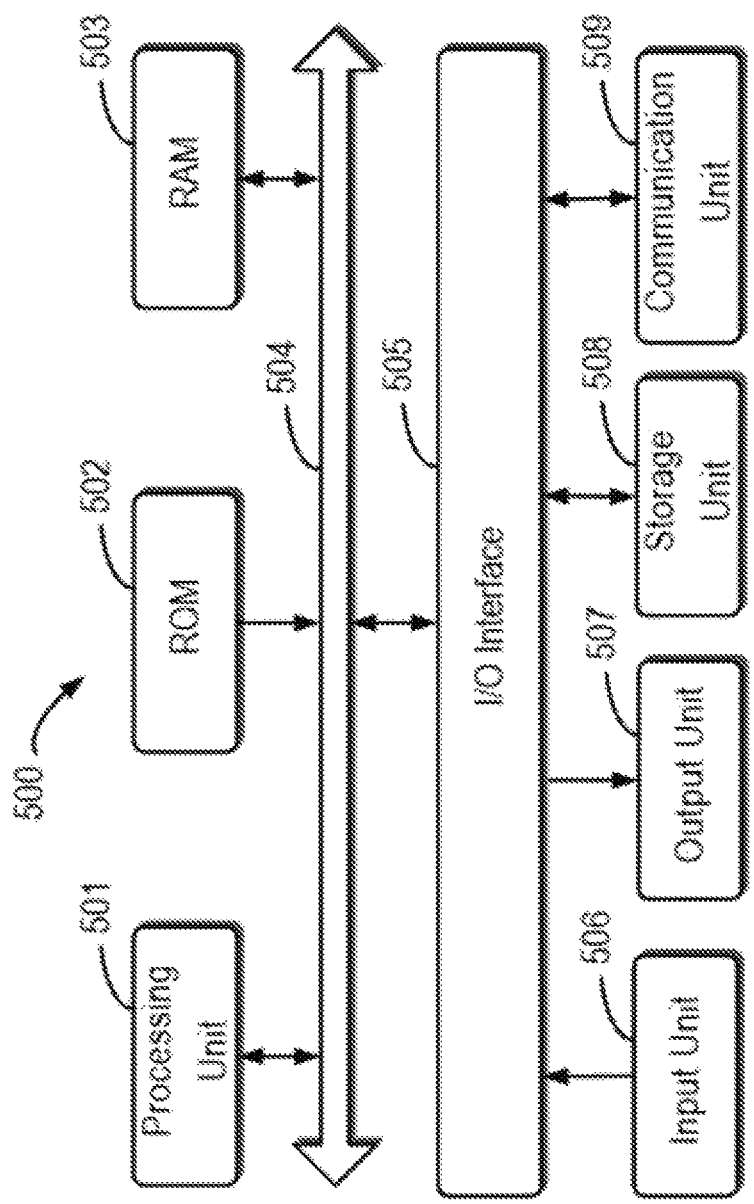
FIG. 5 illustrates a schematic block diagram of an apparatus that may be used for implementing an embodiments of the present disclosure.

FIG. 5 illustrates a schematic block diagram for implementing apparatus 500 according to the embodiments of the present disclosure. As shown in the figure, apparatus 500 comprises a processing unit (for example but not limited to a CPU) 501 which can perform various suitable actions and processing based on computer program instructions stored in read-only-memory (ROM) 502 or from storage unit 508 (for example, computer program instructions loaded from storage unit 508 to the random access memory (RAM) 503). In RAM 503, various programs and data required for operating apparatus 500 may also be stored. Processing unit 501, ROM 502 and RAM 503 are connected with each other via a bus 504 and an input/output (IO) interface 505 is also connected to the bus 504.

A plurality of components within the apparatus 500 are connected to the I/O interface 505. The plurality of components include: an input unit 506, such as a keyboard and a mouse; an output unit 507, such as a display and a loudspeaker of various types; storage unit 508, such as a disk or a compact disk, etc.; and a communication unit 509, such as a network card, a modem or a wireless communication transceiver, etc. The communication unit 509 allows the apparatus 500 to communicate information/data with other devices via a computer network such as an internet and/or various telecommunication networks.

All the processes and processing described above, such as method 200, may be implemented by the processing unit 501. For example, in some embodiments, method 200 can be implemented as a computer software program which is embedded tangibly in machine readable medium, such as the storage unit 508. In some embodiments, a part of or all of a computer program may be loaded and/or installed into apparatus 500 via ROM 502 and/or communication unit 509. When loaded to RAM 503 and executed by the processing unit 501, the computer program can implement one or more of the steps of method 200 described above.

Therefore, solutions of the present disclosure may be provided in various manners. For example, in some embodiments, functions of various components of the apparatus shown in the figures or steps of a method shown in the figures may be provided by software, dedicated hardware and hardware that is associated with a proper software and can implement a software, or firmware, or a combination thereof. When it is provided by a processor, the function may be provided by a single dedicated processor, a single shared processor or a plurality of separate processors. Moreover, the term "processor" can include but is not limited to digital signal processor (DSP) hardware, a network processor, application-specific integrated circuit (ASIC), field programmable gate array (FPGA), read only memory (ROM) for storing software, random access memory (RAM) and a non-volatile storage device. It may also include other conventional and/or customized hardware.

Those skilled in the art should appreciate that the specification and drawings only illustrate principles of the embodiments. Therefore, it should be understood that those skilled in the art can design various arrangements, which though not clearly described or shown, embody the principles of embodiments of the present disclosure and are included in, the spirit and scope of embodiments of the present disclosure. In addition, all the examples are illustrated herein mainly for teaching purpose to facilitate readers in understanding principles of embodiments of the present disclosure and concepts contributed by the inventor to advance the field, and the embodiments should not be interpreted as limiting to examples and conditions elaborated herein. Meanwhile, all the statements describing principles, aspects and embodiments of the present disclosure also intend to include also their equivalents.

We claim:

1. A method for a storage service, comprising:
   receiving a storage service template from a user, the storage service template specifying a plurality of storage service policies for the user and a corresponding chained set of storage service functions for execution in a template-specified predetermined order, the storage service functions having respective data inputs and data outputs and being chained together such that the data output of a given storage service function is equal to mandatory data input requirements of a corresponding next successive storage service function; and
   providing the chained set of storage service functions according to the storage service template, the chained set of storage service functions being performed on data of the user to obtain processed user data accordingly, including intermediate data generated by corresponding storage service functions and provided as input to corresponding next successive storage service functions.

2. The method according to claim 1, wherein the storage service template specifies the storage service policies for the user by indicating the storage service policies from a predefined set of storage service policies.

3. The method according to claim 1, wherein the storage service policies are defined with a work flow engine, and wherein a task in the work flow engine corresponds to a storage function node or a type of storage service.

4. The method according to claim 1, wherein the storage service template further specifies a network for providing the storage service.

5. The method according to claim 1, wherein each storage service policy further defines at least one of an execution module for the corresponding storage service function and a parameter for performing the storage service function.

6. The method according to claim 5, wherein the execution module for the storage service function includes a virtual machine or a container image.

7. The method according to claim 5, wherein the parameter for performing the storage service function includes a triggering condition for the storage service function.

8. The method according to claim 1, wherein the predetermined order of storage service functions include: a stream read function to obtain the data of the user from a socket, followed by an intermediate function to process the data of the user to a form for backup, followed by a backup function to receive the backup-form user data and store it as backup data.

9. The method according to claim 1,
   wherein the storage service template specifies the storage service functions by indicating respective storage service policies from a predefined set of storage service policies, each storage service policy including a respective storage service policy identifier and an identifier of a respective executable image for the respective storage service function,
   and wherein the storage service template includes a policies section having a set of sub-sections for respective ones of the storage service functions, the sub-sections including (1) respective ones of the storage service policy identifiers to identify the corresponding storage service policies, and (2) information linking the sub-sections to define the predetermined-order chaining of the function nodes.

10. A system, comprising:
    a data storage system including one or more processors and memory; and computer-executable program logic encoded in memory of one or more computers enabled to provide storage services, wherein the computer-executable program logic is configured for the execution of:
    receiving a storage service template from a user, the storage service template specifying a plurality of storage service policies for the user and a corresponding chained set of storage service functions for execution in a template-specified predetermined order, the storage service functions having respective data inputs and data outputs and being chained together such that the data output of a given storage service function is equal to mandatory data input requirements of a corresponding next successive storage service function; and
    providing the chained set of storage service functions according to the storage service template, the chained set of storage service functions being performed on data of the user to obtain processed user data accordingly, including intermediate data generated by corresponding storage service functions and provided as input to corresponding next successive storage service functions.

11. The system of claim 10, wherein the storage service template specifies the storage service policies for the user by indicating the storage service policies from a predefined set of storage service policies.

12. The system of claim 10, wherein the storage service policies are defined with a work flow engine, and wherein a task in the work flow engine corresponds to a storage function node or a type of storage service.

13. The system of claim 10, wherein the storage service template further specifies a network for providing the storage service.

14. The system of claim 10, wherein each storage service policy further defines at least one of an execution module for the corresponding storage service function and a parameter for performing the storage service function.

15. The system of claim 14, wherein the execution module for the storage service function includes a virtual machine or a container image.

16. The system of claim 14, wherein the parameter for performing the storage service function includes a triggering condition for the storage function.

17. A computer program product for providing a storage service, the computer program product comprising:
    a non-transitory computer readable storage medium encoded with computer-executable code, the code configured to enable the execution of:
    receiving a storage service template from a user, the storage service template specifying a plurality of storage service policies for the user and a corresponding chained set of storage service functions for execution in a template-specified predetermined order, the storage service functions having respective data inputs and data outputs and being chained together such that the data output of a given storage service function is equal to mandatory data input requirements of a corresponding next successive storage service function; and providing the chained set of storage service functions according to the storage service template, the chained set of storage service functions being performed on data of the user to obtain processed user data accordingly, including intermediate data generated by corresponding storage service functions and provided as input to corresponding next successive storage service functions.

18. The computer program product of claim 17, wherein the storage service template specifies the storage service policies for the user by indicating the storage service policies from a predefined set of storage service policies.

19. The computer program product of claim 17, wherein the storage service policies are defined with a work flow engine, and wherein a task in the work flow engine corresponds to a storage function node or a type of storage service.

20. The computer program product of claim 17, wherein the storage service template further specifies a network for providing the storage service.

21. The computer program product of claim 20, wherein each storage service policy further defines at least one of an execution module for the corresponding storage service function and a parameter for performing the storage service function.

22. The computer program product of claim 20, wherein the execution module for the storage service function includes a virtual machine or a container image.

* * * * *